United States Patent
Bae et al.

(10) Patent No.: US 10,092,874 B2
(45) Date of Patent: Oct. 9, 2018

(54) AIR WASHER

(71) Applicant: LG ELECTRONICS INC., Seoul (KR)

(72) Inventors: Sehwan Bae, Seoul (KR); Taeil Kim, Seoul (KR); Huijae Kwon, Seoul (KR); Hyein Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 14/843,357

(22) Filed: Sep. 2, 2015

(65) Prior Publication Data

US 2016/0059175 A1   Mar. 3, 2016

(30) Foreign Application Priority Data

Sep. 3, 2014 (KR) .................. 10-2014-0117220

(51) Int. Cl.
  *B01D 47/02* (2006.01)
  *B01D 53/18* (2006.01)
  (Continued)

(52) U.S. Cl.
  CPC ............. *B01D 47/02* (2013.01); *B01D 47/16* (2013.01); *B01D 53/18* (2013.01); *F24F 6/06* (2013.01);
  (Continued)

(58) Field of Classification Search
  CPC ........ B01D 47/18; B01D 47/02; B01D 47/16; B01D 53/18; B01D 2221/02;
  (Continued)

(56) References Cited

U.S. PATENT DOCUMENTS 2,211,407 A * 8/1940 Christensen ......... A61M 11/041
                                                        219/437
3,420,509 A * 1/1969 Briggin .................... F24F 6/04
                                                        261/142
(Continued)

FOREIGN PATENT DOCUMENTS

CN   203298425   11/2013
CN   203454327   2/2014
(Continued)

OTHER PUBLICATIONS

Air-O-Swiss E2441 evaporator Amazon.com verified purshase review by Napper published on Nov. 11, 2011 available at https://www.amazon.com/Air-O-Swiss-E2441-Evaporator-Humidifier/product-reviews/B001GWRU54.*

(Continued)

*Primary Examiner* — Amber R Orlando
*Assistant Examiner* — Stephen Hobson
(74) *Attorney, Agent, or Firm* — Ked & Associates, LLP

(57) ABSTRACT

An air washer includes an outer case having an air suction port, a water tub disposed in the outer case to store water, a humidification unit disposed in the water tub, a display unit disposed so as to be spaced apart from the outer case to form an air discharge port, the display unit having a water supply port, through which water is supplied, an inner case located at an upper side of the water tub, the inner case having an air channel, connecting the air suction port with the air discharge port, and a water channel, along which the water injected through the water supply port is guided to the water tub, and a blower disposed in the inner case to blow air suctioned through the air suction port to the air discharge port.

18 Claims, 4 Drawing Sheets

(51) Int. Cl.
*F24F 6/06* (2006.01)
*B01D 47/16* (2006.01)
*F24F 6/00* (2006.01)
*F24F 3/16* (2006.01)
*B01D 46/00* (2006.01)
*B01D 47/18* (2006.01)
*F24F 11/52* (2018.01)

(52) U.S. Cl.
CPC .............. *B01D 46/00* (2013.01); *B01D 47/18* (2013.01); *B01D 2221/02* (2013.01); *B01D 2247/14* (2013.01); *B01D 2252/103* (2013.01); *F24F 3/1603* (2013.01); *F24F 11/52* (2018.01); *F24F 2006/008* (2013.01); *F24F 2006/065* (2013.01)

(58) Field of Classification Search
CPC .............. B01D 2247/14; B01D 46/00; B01D 2252/103; F24F 2006/065; F24F 6/06; F24F 11/52; F24F 3/1603; F24F 2006/08
See application file for complete search history.

(56) References Cited

U.S. PATENT DOCUMENTS

| | | | | |
|---|---|---|---|---|
| 3,687,424 | A * | 8/1972 | Katzman | A61L 9/14 261/119.1 |
| 3,787,036 | A * | 1/1974 | Hastings | F24F 6/06 261/106 |
| 3,873,806 | A * | 3/1975 | Schossow | F24F 6/025 126/113 |
| 4,203,027 | A * | 5/1980 | O'Hare | A61M 16/16 128/203.27 |
| 4,943,704 | A * | 7/1990 | Rabenau | A61M 16/16 261/104 |
| 5,247,604 | A * | 9/1993 | Chiu | F22B 1/284 239/135 |
| 5,336,156 | A * | 8/1994 | Miller | A61G 11/00 119/312 |
| 5,783,117 | A * | 7/1998 | Byassee | F24F 6/043 261/107 |
| 5,792,390 | A * | 8/1998 | Marino | F24F 6/00 215/359 |
| 6,832,753 | B1 * | 12/2004 | Huang | F24F 6/06 261/28 |
| 7,335,157 | B2 * | 2/2008 | Czupich | A61G 11/00 600/22 |
| 7,467,786 | B2 * | 12/2008 | Jae-Bong | F24F 6/02 261/81 |
| 7,712,249 | B1 * | 5/2010 | Modlin | A01M 1/205 239/102.2 |
| 2007/0152356 | A1 * | 7/2007 | Huang | F24F 6/00 261/81 |
| 2008/0127820 | A1 * | 6/2008 | Park | A61L 9/122 95/1 |
| 2010/0170511 | A1 * | 7/2010 | Payne | A61M 16/167 128/204.14 |
| 2014/0083524 | A1 * | 3/2014 | Huang | F24F 6/00 137/409 |
| 2014/0216259 | A1 * | 8/2014 | Iwaki | F24F 3/166 96/19 |
| 2015/0008599 | A1 * | 1/2015 | Hou | F24F 6/12 261/5 |
| 2015/0115482 | A1 * | 4/2015 | Jang | F24F 6/00 261/24 |
| 2016/0169542 | A1 * | 6/2016 | Yoon | F24F 13/20 261/72.1 |
| 2016/0175757 | A1 * | 6/2016 | Yoon | F24F 6/06 261/30 |
| 2017/0074532 | A1 * | 3/2017 | Kim | F24F 6/00 |
| 2017/0122607 | A1 * | 5/2017 | Son | F24F 6/16 |
| 2017/0363308 | A1 * | 12/2017 | McDonnell | F24F 11/30 |

FOREIGN PATENT DOCUMENTS

| | | | |
|---|---|---|---|
| DE | 1958910 U | 4/1967 | |
| DE | 3141596 | 7/1982 | |
| EP | 1647322 A2 * | 4/2006 | ............. B01D 47/18 |
| EP | 2 865 956 A1 | 4/2015 | |
| EP | 2865956 A1 * | 4/2015 | ............... F24F 6/16 |
| EP | 3009758 A1 * | 4/2016 | ............... F24F 6/06 |
| JP | S 54-160047 | 12/1979 | |
| KR | 10-0928907 | 11/2009 | |
| KR | 10-2011-0106217 | 9/2011 | |
| KR | 10-2013-0011170 A | 1/2013 | |
| KR | 20130011170 A * | 1/2013 | ............... F24F 6/06 |
| KR | 20160025968 * | 3/2016 | |
| KR | 20160025974 * | 3/2016 | |
| KR | 20160028293 * | 3/2016 | |
| KR | 20160051256 * | 5/2016 | |
| KR | 20160051257 * | 5/2016 | |
| KR | 20160051259 * | 5/2016 | |
| WO | WO 2012/091369 A2 | 7/2012 | |
| WO | WO-2012091369 A2 * | 7/2012 | ............. F24F 6/043 |
| WO | WO 2013/012179 | 1/2013 | |

OTHER PUBLICATIONS

Air-O-Swiss E2441 Evaporator instructions for use published Jun. 2008.*
Transcription and screenshots of "Evaporator Air-O-Swiss E2441A: Operation Video" published Oct. 21, 2011 https://www.youtube.com/watch?v=RzELFC7p2M8.*
European Search Report dated Feb. 16, 2016 issued in Application No. 15183220.1.
Chinese Office Action dated Sep. 5, 2017 issued in Application No. 201510556266.9 (with English translation).

* cited by examiner

AIR WASHER

CROSS-REFERENCE TO RELATED APPLICATION

This application claims priority under 35 U.S.C. § 119 to Korean Patent Application No. 10-2014-0117220, filed on Sep. 3, 2014 in the Korean Intellectual Property Office, whose entire disclosure is hereby incorporated by reference.

BACKGROUND

1. Field

The present disclosure relates to an air washer, and more particularly, to an air washer having a water channel, through which water is replenished even during operation of the air washer.

2. Background

In general, an air washer is an air purifier that purifies air containing contaminants into fresh air. Air washers are classified into (1) a filter type air washer, which sucked air, purifies the suctioned air using a filter, and discharges the purified air out of the air washer, (2) an electrostatic precipitation type air purifier, which purifies contaminated air with a dust collection plate having dust collecting force using a principle of an electric discharge, and (3) a water filter type air washer, which uses water as a filter. Since the water filter type air washer uses water, additional expenses are not incurred. For this reason, the use of the water filter type air washer has been increasing.

The water filter type air washer includes a water tub, a humidification filter configured to absorb water in the water tub, and a fan configured to blow air to a humidification filter and to discharge the filtered air out of the air washer. The water filter type air washer is configured such that when the level of the water in the water tub is reduced, a user may supply water into the water tub.

BRIEF DESCRIPTION OF THE DRAWINGS

The embodiments will be described in detail with reference to the following drawings in which like reference numerals refer to like elements wherein.

DETAILED DESCRIPTION

Figure 1:
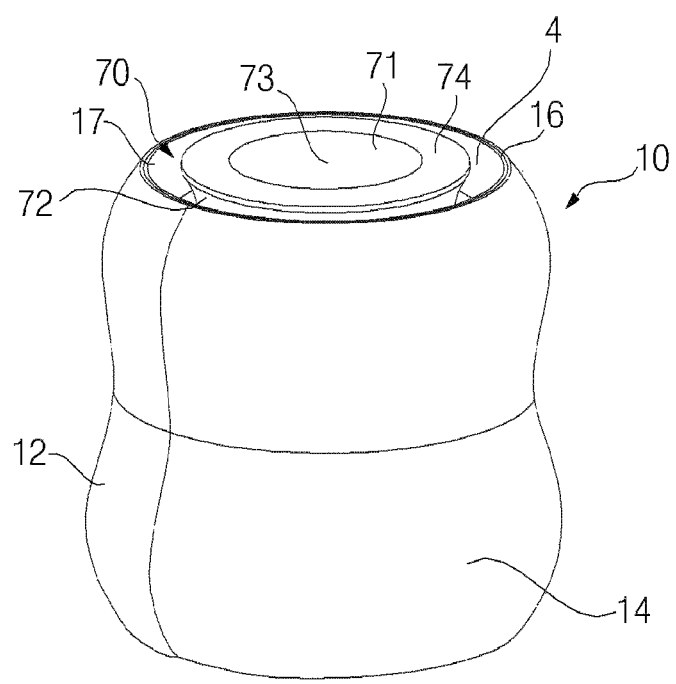
FIG. 1 is a perspective view showing an air washer according to a first embodiment of the present disclosure.
Figure 2:
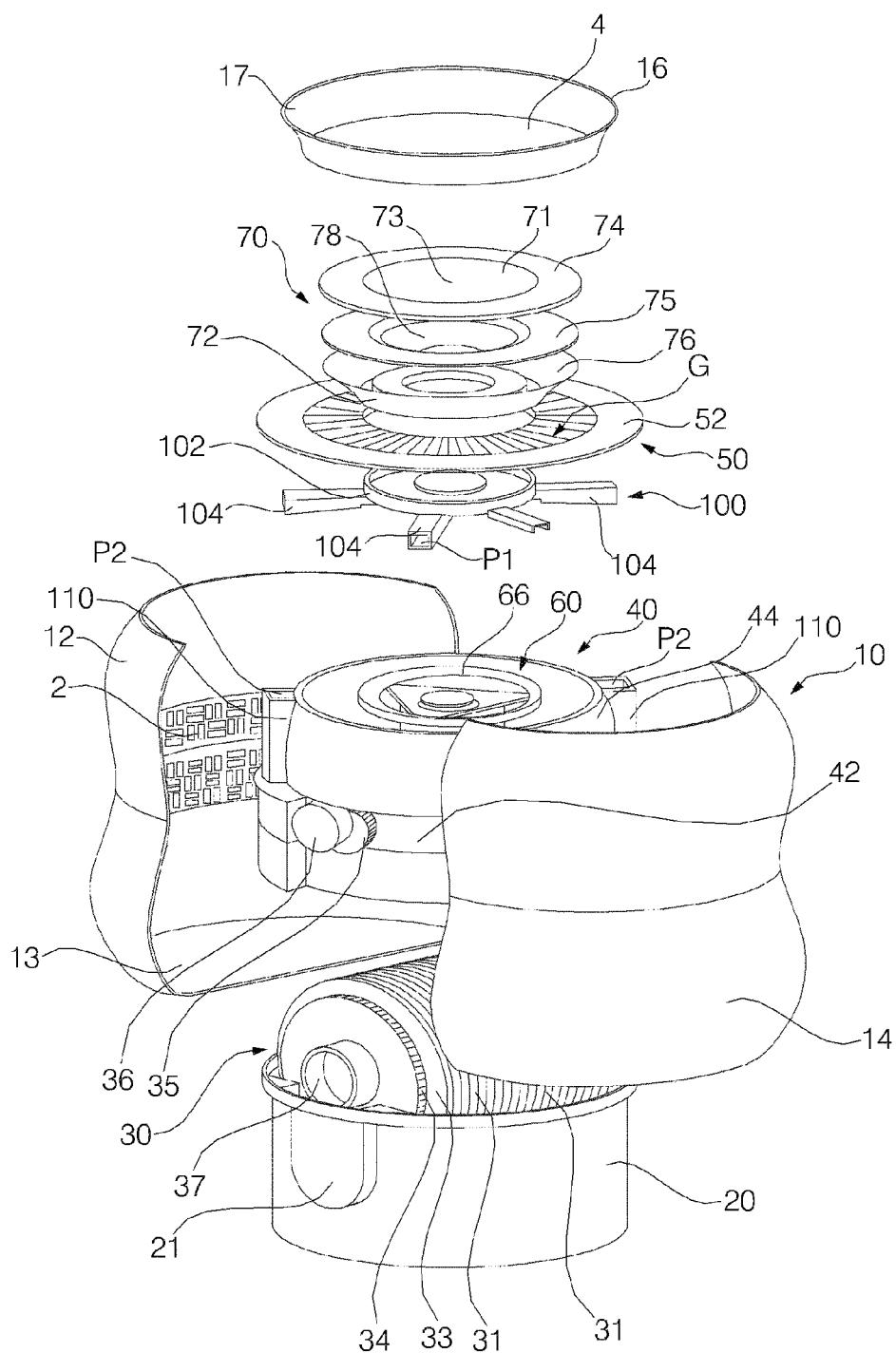
FIG. 2 is an exploded perspective view of FIG. 1.
Figure 3:
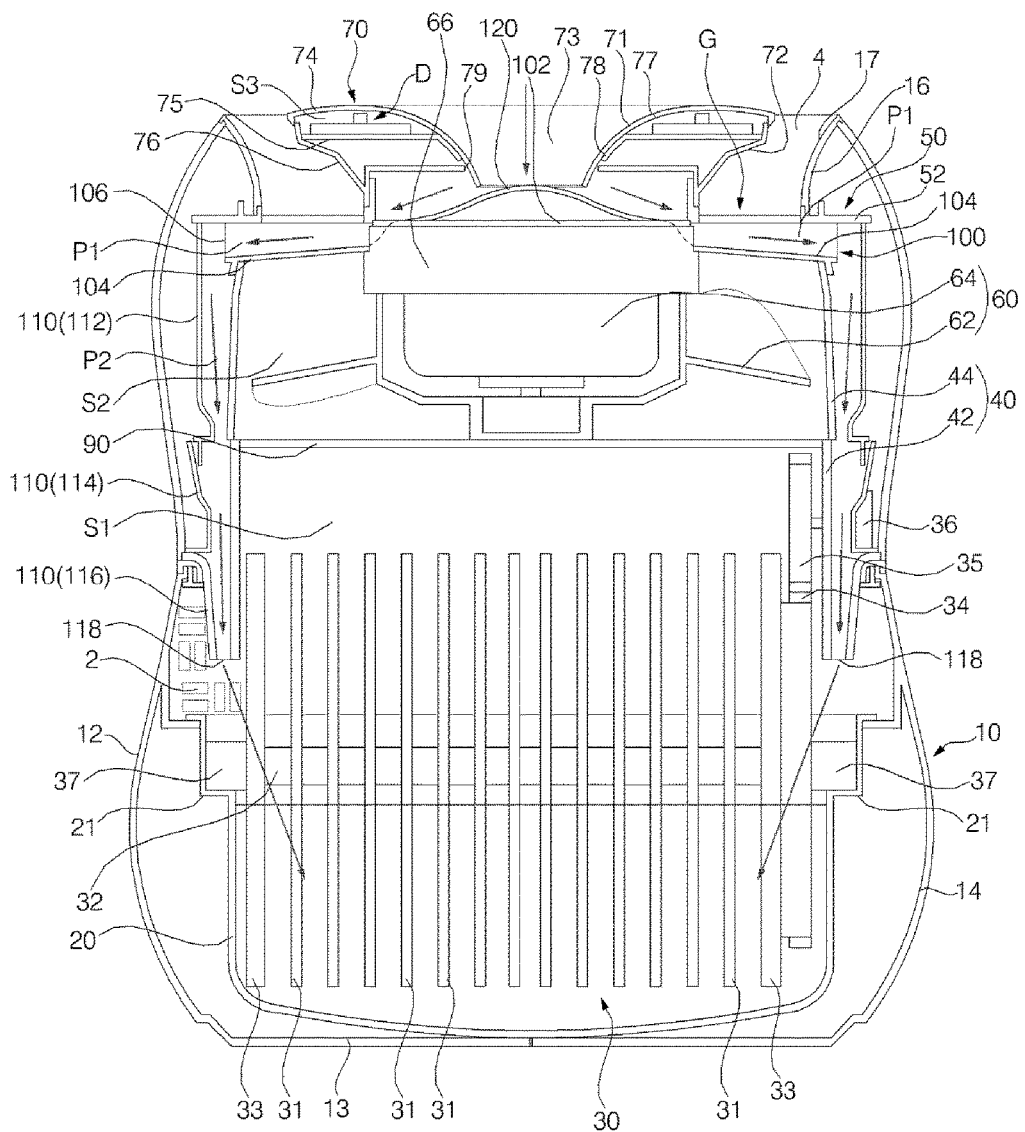
FIG. 3 is a sectional view showing a water channel of the air washer according to the first embodiment of the present disclosure.
Figure 4:
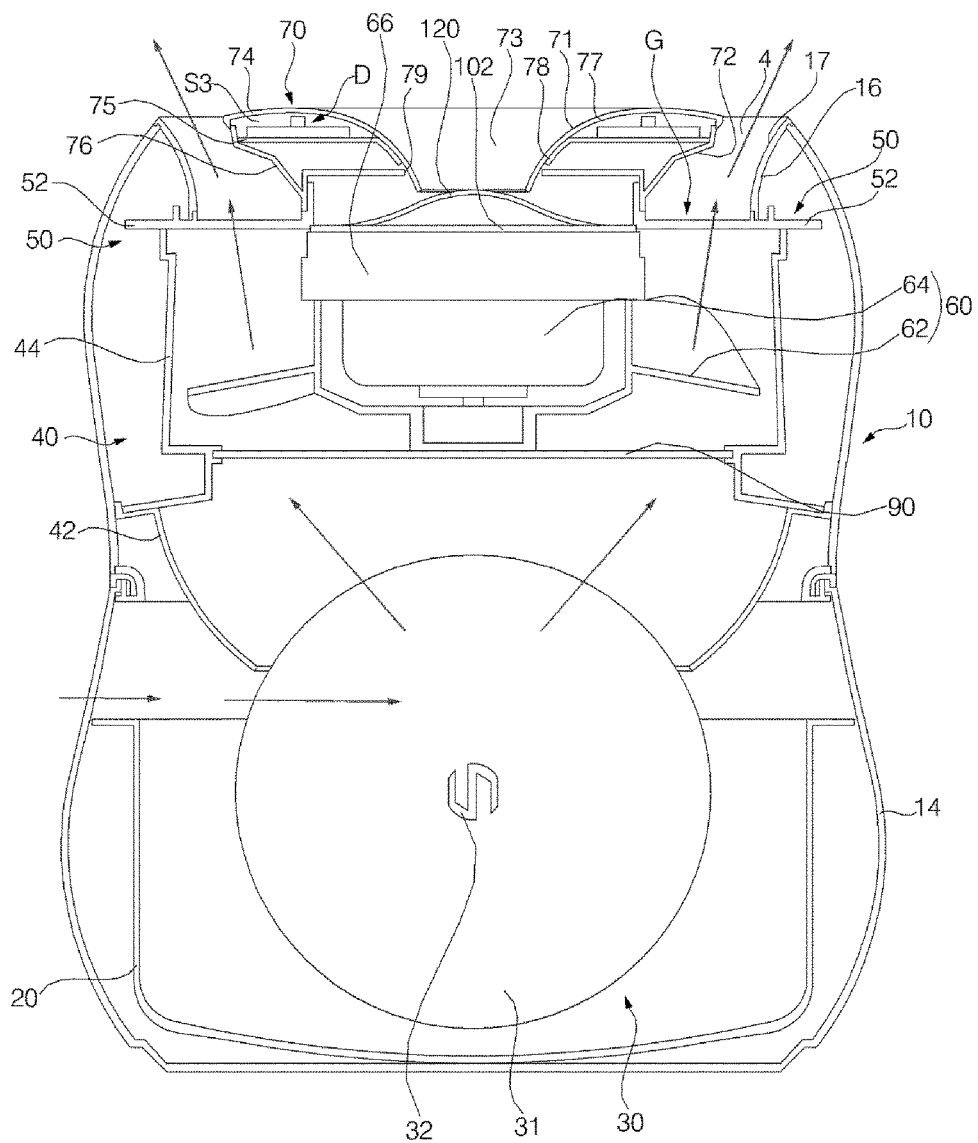
FIG. 4 is a sectional view showing an air channel of the air washer according to the first embodiment of the present disclosure.

FIG. 1 is a perspective view showing an air washer according to a first embodiment of the present disclosure, FIG. 2 is an exploded perspective view of FIG. 1, FIG. 3 is a sectional view showing a water channel of the air washer according to the first embodiment of the present disclosure, and FIG. 4 is a sectional view showing an air channel of the air washer according to the first embodiment of the present disclosure.

An outer case 10 has an air suction port 2 and an air discharge port 4, and a water tub 20 is disposed in the outer case 10 to store water. A humidification unit 30 is disposed such that a portion of the humidification unit 30 is immersed in the water tub 20. A display unit 70 is spaced apart from the outer case 10 by a predetermined distance to form the air discharge port 4, and the display unit 70 allows a water supply port 73 through which water is injected or supplied. An inner case 40 is disposed in the outer case 10 such that the inner case 40 is located at the upper side of the water tub 20, and the inner case 40 has an air channel, along which air flows, and a water channel, along which the water supplied through the water supply port 73 is guided to the water tub 20. A blower 60 is located at the upper side of the inner case 40 to blow air.

The air washer according to this embodiment is characterized in that the air discharge port 4 and the water channel are formed at the upper side of the air washer. In this embodiment, the water supply port 73, through which water is injected, is located at the upper side of the air washer. The water supply port 73 forms a portion of the water channel. In this embodiment, the water supply port 73 is provided with the display unit 70.

The water channel, along which water is supplied, and the air channel, along which internal air is discharged outward, are partitioned from each other. The air washer is configured to have a structure that is capable of naturally evaporating water while rotating the humidification unit 30.

The air washer is configured to have a structure that is capable of injecting water through the water supply port 73 even during the rotation of the humidification unit 30. The air washer is configured to have a structure that is capable of replenishing water without stopping the humidification unit 30.

The air discharge port 4 is formed between the display unit 70 and the outer case 10. The air discharge port 4 is disposed outside the water supply port 73. The water supply port 73, through which water is injected, and the air discharge port 4, through which air is discharged, are partitioned from each other.

The outer case 10 suctions air in a lateral direction and discharges the suctioned air upward. The outer case 10 is divided into left and right cases. Alternatively, the outer case 10 may be divided into upper and lower cases.

The outer case 10 according to this embodiment may include a first outer body 12, in which the air suction port 2 is formed, a second outer body 14 coupled to the first outer body 12, and a discharge guide 16, located at the upper side of the first outer body 12 and the second outer body 14, in which the air discharge port 4 is formed. In this embodiment, the air discharge port 4 is directed upward. External air is suctioned into the outer case 10 through the air suction port 2 in a horizontal direction. The air in the outer case 10 is discharged upward through the air discharge port 4. A suction grill may be formed in the first outer body 12, in which the air suction port 2 is formed. A filter configured to filter dust may be disposed in the air suction port 2.

The air discharge port 4 may be formed in a vertical direction with respect to the outer case 10. In this embodiment, the air discharge port 4 is configured to discharge air upward with respect to the outer case 10 and, in addition, to discharge air in a radial direction. The air discharge port 4 is formed to have a circular shape. Air discharged through the air discharge port 4 may be uniformly diffused to the front, the rear, the left, and the right of the outer case 10.

The outer case 10 has the first outer body 12 and the second outer body 14 coupled to each other and is formed to be hollow. The outer case 10 may be divided into the first outer body 12 and the second outer body 14. When viewed from above, the first outer body 12 and the second outer body 14 are disposed symmetrically or the first outer body 12 and the second outer body 14 are opposite to each other.

Alternatively, one of the first outer body 12 and the second outer body 14 may have a larger size than the other of the first outer body 12 and the second outer body 14. In addition, the outer case 10 may be divided into three cases.

The water tub 20 may be located at the bottom of the outer case 10. The bottom of the outer case 10 may be defined as a water tub location part 13. Alternatively, another water tub location part 13 may be disposed at the outer case 10. The bottoms of the first outer body 12 and the second outer body 14 form the water tub location part 13.

The air discharge port 4 is a space defined between the outer case 10 and the display unit 70. The discharge guide 16 is located at the upper side of the first outer body 12 and the second outer body 14. The discharge guide 16 is located at the inner side of the first outer body 12 and the second outer body 14.

The display unit 70 is located at the inner side of the discharge guide 16. In this embodiment, the discharge guide 16 may be formed to have a ring shape. The display unit 70 may be spaced apart from the discharge guide 16. In this embodiment, the display unit 70 may be located at the center of the discharge guide 16.

The discharge guide 16 has a radius that gradually increases upward such that air having passed through the air discharge port 4 is widely diffused upward. A portion of the outer circumference of the discharge guide 16 may be opposite to the first outer body 12, and the remaining portion of the outer circumference of the discharge guide 16 may be opposite to the second outer body 14. The discharge guide 16 may be disposed such that at least a portion of the inner circumference 17 of the discharge guide 16 is opposite to the display unit 70. The air channel, along which air in the outer case 10, is discharged outward, may be formed between the inner circumference 17 of the discharge guide 16 and the display unit 70.

The water tub 20 stores water. The water tub 20 is formed to have the shape of a bucket that is open at the top thereof. The water tub 20 is located in the outer case 10 at the lower part of the outer case 10. The water tub 20 is located at the water tub location part 13, which is formed at at least one of the first outer body 12 and the second outer body 14.

The humidification unit 30 absorbs the water in the water tub 20 to naturally evaporate the water. The humidification unit 30 is rotated in a state in which the humidification unit 30 is partially immersed in the water tub 20. Air suctioned through the air suction port 2 may be humidified by the humidification unit 30 while passing through the humidification unit 30. Only a portion of the humidification unit 30 is immersed in the water tub 20. The immersed portion of the humidification unit 30 may absorb the water in the water tub 20.

The humidification unit 30 may include an absorption member to absorb water and to supply the absorbed water into the air. The absorption member may be a humidification filter for filtering foreign matter from the air by adsorption while contacting the air. The absorption member may be formed to have a disk shape. Hereinafter, the absorption member will be described as a disk 31.

The humidification unit 30 includes a plurality of disks 31. The disks 31 are spaced apart from each other. An air passage, along which air passes, is formed between the spaced disks 31. The disks 31 may be disposed in a state in which the disks 31 are erected in a vertical direction. The disks 31 may be arranged in parallel to each other in a horizontal direction.

The humidification unit 30 may include a disk rotating mechanism configured to rotate the disks 31. The disk rotating mechanism includes a rotary shaft 32 coupled to the disks 31 and a disk cover 33 coupled to the rotary shaft 32. A pair of disk covers 33 is provided. The disks 31 are arranged between the disk covers 33. The disk covers 33, the disks 31, and the rotary shaft 32 may be assembled into a single body. In this embodiment, the disk covers 33, the disks 31, and the rotary shaft 32 may be defined as a disk assembly.

Each of the disk covers 33 is provided with a protrusion 37. The protrusions 37 are rotatably disposed in the water tub 20. The disk assembly may be rotated about the protrusions 37. In this embodiment, the protrusions 37 and the rotary shaft 32 are arranged on the same axis. Alternatively, the protrusions 37 and the rotary shaft 32 may be arranged on different axes.

The water tub 20 may be provided with protrusion receiving parts 21. The protrusions 37 are located in the respective protrusion receiving parts 21. The protrusions 37 may be rotated in a state of being supported by the protrusion receiving parts 21. The disk assembly may be spaced apart from the bottom of the water tub 20 in a state in which the protrusions 37 are disposed in the water tub 20.

The disk rotating mechanism may include a driven gear 34 formed at one of the disk covers 33, a driving gear 35 engaged with the driven gear 34, and a motor 36 configured to rotate the driving gear 35. The driven gear 34 may be formed at at least one of the two disk covers 33. Driving force from the motor 36 is transferred to the disk assembly via the driving gear 35 and the driven gear 34. As a result, the disks 31 of the disk assembly are rotated together. The disks are rotated in a state in which the disks 31 are partially immersed in the water tub 20.

The motor 36 may be mounted in the outer case 10 or the inner case 40. In this embodiment, the motor 36 is mounted in the inner case 40. When the inner case 40 is coupled to the outer case 10, the driving gear 35 is engaged with the driven gear 34. The driving gear 35 is located on the side of the inner case 40, and the driven gear 34 is located on the side of the outer case 10.

When the disk assembly is located in the water tub 20, the disks 31 partially protrude upward from the water tub 20 such that contact between the upwardly protruding portions of the disks 31 and the air is improved. The portions of the disks 31 protruding upward from the water tub 20 are located in the inner case 40. Air suctioned through the air suction port 2 passes through the interior of the inner case 40, and then flows to the air discharge port 4. While passing through the interior of the inner case 40, the air contacts the disks 31 with the result that the air is humidified. The humidified air flows upward through the interior of the inner case 40. In this embodiment, the inner case 40 is formed to have a hollow cylindrical shape.

A filter 90 may be disposed in the inner case 40. The filter 90 may filter the air flowing through the interior of the inner case 40. The filter 90 may be located higher than the disk assembly, and is located lower than the blower 60. The filter 90 is horizontally disposed in the inner case 40. The filter 90 may filter the humidified air.

The inner case 40 may be manufactured as a single integral unit. In this embodiment, the inner case 40 is divided into two parts such that the inner case 40 can be assembled easily and conveniently. The inner case 40 includes a lower inner case 42 and an upper inner case 44. The upper inner case 44 is assembled to the upper side of the lower inner case 42.

A lower space S1 is defined in the lower inner case 42. A portion of the disk assembly is received in the lower space S1. An upper space S2 is defined in the upper inner case 44. The blower is mounted in the upper space S2. The lower inner case 42 and the upper inner case 44 may be detachably mounted. Air flows to the blower through the upper space S2 and the lower space S1. The upper space S2 and the lower space S1 form a portion of the air channel. Air suctioned through the air suction port 2 is introduced into the lower space S1 through a gap defined between the water tub 20 and the lower inner case 42.

Meanwhile, the air washer according to this embodiment may further include a discharge grill 50 disposed at the upper side of the inner case 40 to allow air to pass therethrough. A grill part G may be formed in the discharge grill 50. The discharge grill 50 covers the upper side of the inner case 40.

The discharge grill 50 may be configured such that at least a portion of the grill part G faces a gap defined between the display unit 70 and the discharge guide 16. The discharge grill 50 may protect the blower 60 and the filter 90. The grill part G may be generally formed to have a ring shape. The discharge grill 50 may include a location part 52 located at the upper end of a lower water supply guide 110 to surround the outer circumference of the grill part G. The location part 52 may be formed to have a ring shape. The location part 52 may be located at the upper end of the inner case 40.

The blower 60 may be mounted in at least one selected from among the inner case 40, the discharge grill 50, and an upper water supply guide 100, which will hereinafter be described. In this embodiment, the blower 60 may be located below the discharge grill 50 and the upper water supply guide 100. The blower 60 may be located at the lower side of the discharge grill 50 such that the blower 60 does not directly contact water. The blower 60 is located at the lower side of the discharge grill 50 such that the blower 60 is protected. The blower 60 is located in the discharge grill 50 and the inner case 40 such that the blower 60 is prevented from being exposed to the outside.

The blower 60 may include a propeller fan 62 and a motor configured to rotate the propeller fan 62. The blower 60 may further include a motor mount 66, at which the motor 64 is mounted. In this embodiment, the motor mount 66 is assembled to the upper water supply guide 100. The blower 60 is suspended from the upper water supply guide 100. The motor mount 66 may be fastened to the upper water supply guide 100 using a fastening member, such as a screw. The motor mount 66 may be assembled to the upper water supply guide 100 by fitting. The motor 64 may have a rotary shaft extending downward. The propeller fan 62 is coupled to the rotary shaft of the motor 64. The propeller fan 62 is rotated in the inner case 40.

The display unit 70 is located with the discharge guide 16. The display unit 70 includes a top cover 72, in which the water supply port 73 is formed, and a lower cover 76 coupled to the top cover 72 in a state of being located at the lower side of the top cover 72. The water supply port 73 and the top cover 72 of the display unit 70 are exposed to the outside. The water supply port 73 is formed through the top cover 72 in a vertical direction.

The top cover 72 is provided with a water channel surface 71 configured to guide water to the water supply port 73. The lower cover 76 is provided at the outside thereof with an air channel surface 72 configured to guide discharged air. The top cover 72 is provided with an outer water supply guide 77 configured to guide water to the water supply port 73. The top cover 72 and the lower cover 76 are assembled to each other to define a receiving space S3 therein.

An inner installation plate 75, on which a display part D is installed, is disposed in the receiving space S3. The display part D, which is installed on the inner installation plate 75, may be transmitted through the top cover 72 in order to provide information to a user. The inner installation plate 75 is provided in the center thereof with a hollow part 78. The inside of the outer water supply guide 77 extends downward through the hollow part 78.

The lower cover 76 is provided in the center thereof with a through hole 79. The inside of the outer water supply guide 77 extends downward through the through hole 79. That is, the inside of the outer water supply guide 77, which forms the water supply port 73, extends downward through the hollow part 78 and the through hole 79 in sequence.

A ring-shaped air discharge port may be formed between the display unit 70 and the discharge guide 16. The display unit 70 is disposed at the upper side of the discharge grill 50. The display unit 70 may be located on the discharge grill 50 or the upper water supply guide 100. The display unit 70 may be connected to the discharge guide 16 via a rib.

The water channel surface 71 may be formed in the water supply port 73. When water is supplied from above the water supply port 73, the water may fall through the water supply port 73. Water may be supplied into the air washer through the water supply port 73, which is formed through the display unit 70. The water supply port 73 may be formed such that the area of the water supply port 73 is gradually decreased downward.

The top cover 74 may be a window, through which light emitted from the display part D is transmitted. The display part D may include a printed circuit board (PCB) and at least one light emitting diode (LED) mounted on the PCB. The display part D may be generally formed to have a ring shape. Light emitted from the display part D may be transmitted through the top cover 74. The lower end of the outer water supply guide 77, which forms the water supply port 73, may overlap with the upper water supply guide 100.

Meanwhile, a water channel, along which water injected through the water supply port 73 is guided to the water tub 20, may be formed in the air washer. The air washer may include an upper water supply guide 100 located at the upper side of the inner case 40 to guide water falling from the water supply port 73 and a lower water supply guide 110 disposed in the inner case 40 to guide the water guided by the upper water supply guide 100 to the water tub 20.

The upper water supply guide 100 may be disposed at the discharge grill 50. The upper water supply guide 100 may be integrally formed with the discharge grill 50. In this embodiment, the upper water supply guide 100 is manufactured separately from the discharge grill 50, and is then coupled to the discharge grill 50. The upper water supply guide 100 may be disposed at the upper side of the upper space S1.

The upper water supply guide 100 is located at the lower side of the discharge grill 50. The upper water supply guide 100 includes a center part 102 configured to store water falling from the water supply port 73 and at least one protruding part 104 configured to guide the water stored in the center part 102 to the lower water supply guide 110, the protruding part 104 having a water channel P1 connected to the center part 102.

The protruding part 104 may be disposed outside the center part 102. The center part 102 may be surrounded by the grill part G. The grill part G may surround the outer circumference of the center part 102. A plurality of protruding parts 104 may be provided.

Discharged air may flow around the protruding parts 104. Air guided through the inner case 40 passes by the protruding parts 104, and then flows to the discharge grill 50. The protruding parts 104 connect the center part 102 to the lower water supply guide 110 in the form of a bridge.

A portion of each of the protruding parts 104 may be located below the grill part G. The protruding parts 104 may radially extend from the center part 102. Each of the protruding parts 104 may be configured in the form of a duct, in which the water channel P1 is defined.

Water falling to the center part 12 may pass along the water channels P1 of the protruding parts 104, and may then flow to the lower water supply guide 110. Each of the protruding parts 104 may have a horizontal top surface and a sloping bottom surface. Water introduced into the water channels P1 flows along the slopes of the protruding parts 104.

A decoration part 120 configured to guide water falling from the water supply port 73 to the water channels P1 may be further provided. The decoration part 120 may be mounted in the center part 102. The decoration part 120 is located at the lower side of the water supply port 73. The decoration part 120 may have a convex top surface. Water moving along the decoration part 120 may be easily introduced into the water channels P1 of the protruding parts 104. The decoration part 120 may be an inner water supply guide disposed in the center part 102.

Outlets 106 of the upper water supply guide 100 may be located at the upper part of the lower water supply guide 110. The outlets 106 of the upper water supply guide 100 are formed in the ends of the protruding parts 104. Water guided into the water channels P1 may be introduced into the lower water supply guide 110 through the outlets 106.

The lower water supply guide 110 may be disposed at the inner case 40. In this embodiment, the lower water supply guide 110 is disposed outside the inner case 40. Alternatively, the lower water supply guide 110 may be disposed inside the inner case 40. The lower water supply guide 110 may be manufactured separately from the inner case 40, and may then be mounted to the outer circumference of the inner case 40.

Since the lower water supply guide 110 is disposed outside the inner case, the lower water supply guide 110 is prevented from contacting the blower 60. A plurality of lower water supply guides 110 may be provided based on the number of the protruding parts 104. That is, in a case in which the lower water supply guide 110 includes four protruding parts 104, four lower water supply guides 110 may be provided.

The lower water supply guide 110 may have a water channel P2 defined therein such that the water channel P2 is open in a vertical direction. An outlet 118 may be formed in the lower end of the lower water supply guide 110. The outlet 118 of the lower water supply guide 110 may face the interior of the water tub 20. Water flowing along the lower water supply guide 110 falls to the water tub 20.

The lower water supply guide 110 may be configured as a single duct. In this embodiment, three duct parts 112, 114, and 116 are assembled to form the lower water supply guide 110. The duct parts 112, 114, and 116 are arranged sequentially. The water channel P2 is defined in the duct parts 112, 114, and 116. The first duct part 112 is disposed outside the upper inner case 44. The second duct part 114 and the third duct part 116 are disposed in the lower inner case 42. The position and number of the second and third duct parts 114 and 116 may be variously changed according to embodiments.

The air washer according to this embodiment may further include a controller configured to control the humidification unit 30, the blower 60, and the display unit 70. During the operation of the air washer, the controller may control the humidification unit 30 and the blower 60 to be driven. The controller may control the display part D to display information about the operation of the air washer on the top cover 72 of the display unit 70.

The operation of the air washer with the above-stated construction according to the first embodiment of the present disclosure will be described. During the operation of the air washer, the controller may control the motor 36 of the humidification unit 30 and the motor 64 of the blower 60 to be driven. When the motor 36 of the humidification unit 30 is driven, the driving gear 35 may rotate the driven gear 36. When the driven gear 36 is rotated, the disk assembly, including the disks 31, is rotated.

Water may be uniformly supplied to the disks 31 according to the rotation of the disk assembly. When the motor 64 of the blower 60 is driven, air outside the air washer is suctioned into the outer case 10 through the air suction port 2. The suctioned air flows through a gap defined between the inner case 40 and the water tub 20, and then contacts the disks 31. The air, having contacted the disks 31, flows upward along the inner case 40. The air, having flowed upward along the inner case 40, passes through the filter 90 and the discharge grill 50 in turn. The air having passed through the discharge grill 50 is blown by the blower 60, and then flows to the air discharge port 4.

When the water level in the water tub 20 is lowered according to the operation of the air washer, the controller provides an alarm based on the water level to the display unit 70. At this time, it is possible to supply water to the air washer according to this embodiment even in a state in which the operation of the air washer is not stopped. In addition, it is possible to supply water to the air washer according to this embodiment without disassembling the outer case 10. It is possible for a user to supply water through the water supply port 73 of the air washer during the operation of the air washer such that the water tub 20 is replenished with the water. The water supplied through the water supply port 73 flows through the decoration part 120, the upper water supply guide 100, and the lower water supply guide 110 in turn, and is then stored in the water tub 20.

In the air washer according the present disclosure, it is possible to easily supply water through the water supply port of the display unit without disassembling the outer case. It is also possible to supply water even when the blower and the humidification unit are operating.

Water flows downward through the water supply port, whereby it is possible to minimize the likelihood that the water will be introduced into the display unit. The water supply port may be formed at the display unit, and the air discharge port is formed outside the display unit, whereby it is possible to improve the external appearance of the circumference of the display unit.

The water channel may be formed outside the inner case, whereby it is possible to prevent electric leakage of the blower, to which electricity is supplied. The display unit may be configured such that the air channel and the water channel are partitioned from each other, whereby it is possible to simplify the structure of the air washer.

An air washer is configured such that the structure of the circumference of a display unit is simplified.

An air washer has an air discharge port formed by using a display unit.

An air washer is configured to supply water through a water supply port provided through the center of a display unit.

An air washer is configured to allow a supply of water even during the operation of a blower.

An air washer is configured such that a water channel, along which water flows, is disposed outside an inner case, in which a blower is disposed.

An air washer includes an outer case having an air intake port, a water tub disposed in the outer case to store water, a humidification module disposed in the water tub, a display module disposed so as to be spaced apart from the outer case to form an air discharge port, the display module having a water supply port to allow water to be supplied, an inner case located at an upper side of the water tub, the inner case having an air channel, connecting the air intake port with the air discharge port, and a water channel, along which the water injected through the water supply port is guided to the water tub, and a blower disposed in the inner case to blow air suctioned through the air intake port to the air discharge port.

The air channel may be formed inside the inner case, and the water channel may be formed outside the inner case.

The display module may be spaced apart from the outer case by a predetermined distance to form the air discharge port.

The water supply port may be formed through the display module in a vertical direction, and the air discharge port may be disposed outside the display unit.

The air discharge port may be formed to have a circular shape.

The display module is provided in the water supply port.

The water channel may include an upper water supply guide located at an upper side of the inner case to guide the water supplied through the water supply port, and a lower water supply guide configured to guide the water guided by the upper water supply guide to the water tub.

The upper water supply guide may include a central pan configured to store water falling from the water supply port, and at least one water guide configured to guide the water stored in the central pan to the lower water supply guide, the water guide having a water channel connected to the central pan.

The air washer may further include a contoured decoration panel disposed in the center part at a lower side of the water supply port to guide the water falling from the water supply port to the water guide.

The water guide may be disposed in the air channel of the inner case, and air guided through the inner case may flow around the water guide and then flow to the air discharge port.

The water guide may be disposed in a bridge form connecting the central pan to the lower water supply guide.

The water guide may include a plurality of protrusions arts radially extending from the central pan.

The water guide may be configured in a duct form.

The lower water supply guide may be configured in a duct form.

The lower water supply guide may be provided at an end thereof with an outlet, which may be located inside the water tub.

The display module may include a top cover, in which the water supply port is formed, the top cover being exposed to an outside, and a lower cover coupled to a lower side of the top cover, the air discharge port being defined by the lower cover.

The top cover and the lower cover may be coupled to each other to define a receiving space therein, and the display module may further include an inner installation plate, on which a display is installed, disposed in the receiving space.

The inner installation plate may be provided in the center thereof with a hollow part, and the inside of the top cover, in which the water supply port is formed, may extend downward through the hollow part.

The air washer may further include a discharge grill configured to cover an upper side of the inner case and to allow air guided through the inner case to pass therethrough, wherein the upper water supply guide may be disposed at a lower side of the discharge grill.

The humidification module may include a disk assembly including a plurality of disks disposed such that the disks are partially immersed in the water tub and a disk rotating mechanism configured to rotate the disk assembly, the upper part of the disk assembly being disposed such that a portion of the upper part of the disk assembly is inserted in the inner case.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air washer comprising:
   an outer case having an air intake port;
   a water tub provided in the outer case to store water;
   a humidification module disposed in the water tub;
   a display module disposed so as to be spaced apart from the outer case to form an air discharge port, the display module forming a water supply port to allow water to be supplied;
   an inner case located at an upper side of the water tub, the inner case having an air channel, connecting the air intake port with the air discharge port, and a water channel, along which the water injected through the water supply port is guided to the water tub; and
   a blower provided in the inner case to blow air suctioned through the air intake port to the air discharge port,
   wherein the display module includes:
   a top cover, in which the water supply port is formed, the top cover being exposed to an outside; and
   a lower cover coupled to a lower side of the top cover, the air discharge port being defined by the lower cover, wherein the top cover and the lower cover are coupled to each other to define a receiving space therein, and the display module further includes an inner installation plate, on which a display is installed, disposed in the receiving space, and wherein the inner installation plate is provided in a center thereof with a hollow part, and an inside of the top cover, in which the water supply port is formed, extends downward through the hollow part.

2. The air washer according to claim 1, wherein the air channel is formed inside the inner case, and the water channel is formed outside the inner case.

3. The air washer according to claim 1, wherein the water supply port is formed through the display module in a vertical direction, and the air discharge port is disposed outside the display unit.

4. The air washer according to claim 1, wherein the air discharge port is formed to have a circular shape.

5. The air washer according to claim 1, wherein the display module is provided around the water supply port.

6. The air washer according to claim 1, wherein the water channel includes an upper water supply guide located at an upper side of the inner case to guide the water supplied through the water supply port, and a lower water supply guide configured to guide the water guided by the upper water supply guide to the water tub.

7. The air washer according to claim 6, wherein the upper water supply guide includes a central pan configured to store water falling from the water supply port, and at least one water guide configured to guide the water stored in the central pan to the lower water supply guide, the at least one water guide having a water channel connected to the central pan.

8. The air washer according to claim 7, further comprising a contoured decoration panel disposed in the center part at a lower side of the water supply port to guide the water falling from the water supply port to the at least one water guide.

9. The air washer according to claim 7, wherein the at least one water guide is disposed in the air channel of the inner case, and air guided through the inner case flows around the at least one water guide and then flows to the air discharge port.

10. The air washer according to claim 7, wherein the at least one water guide is disposed in a bridge form connecting the central pan to the lower water supply guide.

11. The air washer according to claim 7, wherein the at least one water guide comprises a plurality of protrusions radially extending from the central pan.

12. The air washer according to claim 6, wherein the lower water supply guide is provided at an end thereof with an outlet, which is located inside the water tub.

13. The air washer according to claim 6, further comprising:
the upper water supply guide being disposed at a lower side of the discharge grill.

14. The air washer according to claim 1, wherein the humidification module comprises:
a disk assembly comprising a plurality of disks disposed such that the disks are partially immersed in the water tub; and
a disk rotating mechanism configured to rotate the disk assembly,
an upper part of the disk assembly being disposed such that a portion of the upper part of the disk assembly is inserted in the inner case.

15. An air washer comprising:
an outer case having an air intake port;
a water tub provided in the outer case to store water;
a humidification module disposed in the water tub;
a display module disposed so as to be spaced apart from the outer case to form an air discharge port, the display module forming a water supply port to allow water to be supplied;
an inner case located at an upper side of the water tub, the inner case having an air channel, connecting the air intake port with the air discharge port, and a water channel, along which the water injected through the water supply port is guided to the water tub; and
a blower provided in the inner case to blow air suctioned through the air intake port to the air discharge port, wherein the water channel includes an upper water supply guide located at an upper side of the inner case to guide the water supplied through the water supply port, and a lower water supply guide configured to guide the water guided by the upper water supply guide to the water tub, and wherein the upper water supply guide includes a central pan configured to store water falling from the water supply port, and at least one water guide configured to guide the water stored in the central pan to the lower water supply guide, the at least one water guide having a water channel connected to the central pan.

16. The air washer according to claim 15, further comprising a contoured decoration panel disposed in the center part at a lower side of the water supply port to guide the water falling from the water supply port to the at least one water guide.

17. The air washer according to claim 15, wherein the at least one water guide is disposed in the air channel of the inner case, and air guided through the inner case flows around the at least one water guide and then flows to the air discharge port.

18. The air washer according to claim 15, wherein the at least one water guide is disposed in a bridge form connecting the central pan to the lower water supply guide, wherein the at least one water guide comprises a plurality of protrusions radially extending from the central pan, and wherein the at least one water guide is configured in a duct form.

* * * * *